Feb. 8, 1927.  
G. H. GILMAN  
1,616,486  
DRILLING MACHINE  
Filed Jan. 6, 1923  2 Sheets-Sheet 1
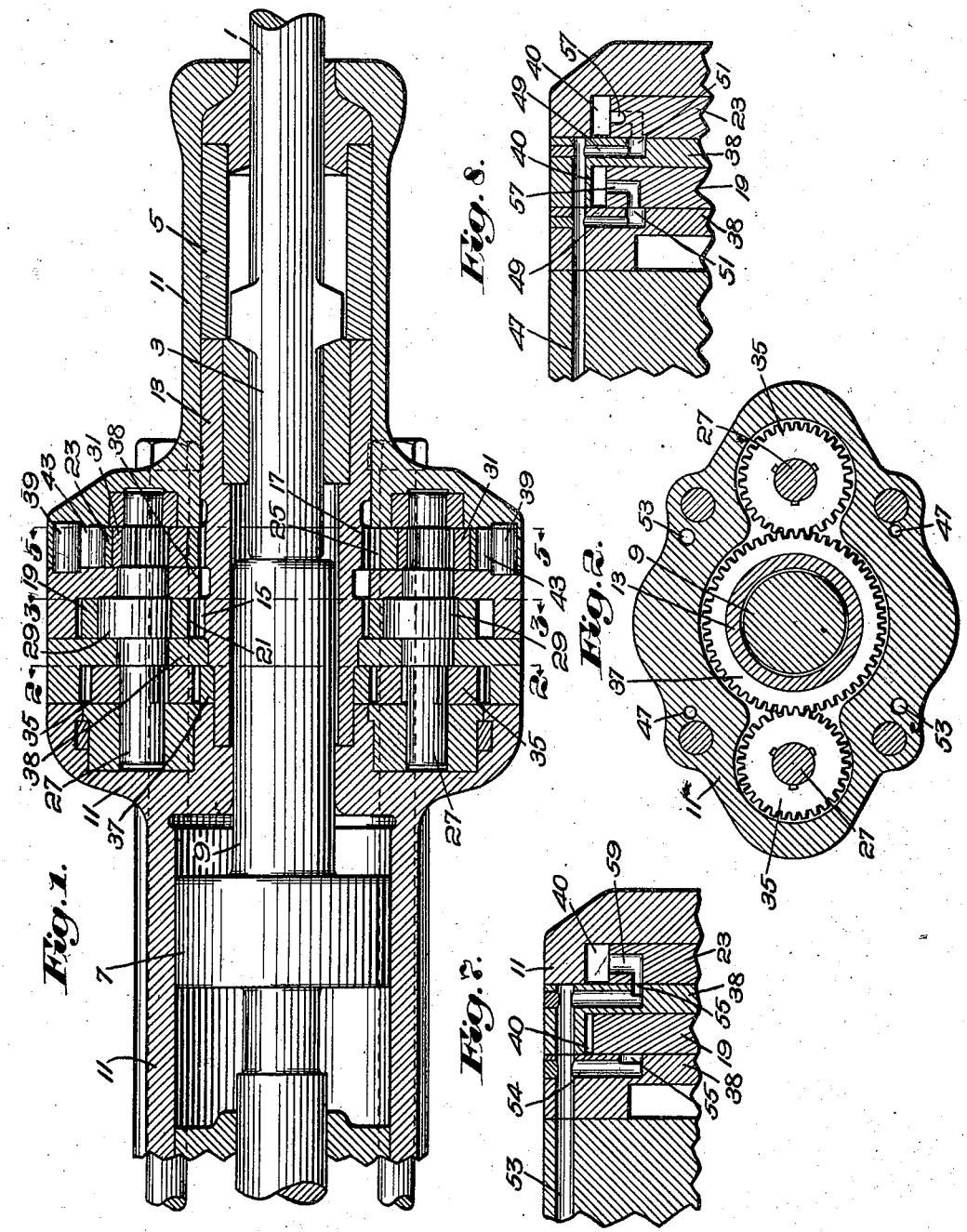
Inventor:
George H. Gilman,
by Emery Booth Janney & Varney
Attys.

Feb. 8, 1927.
G. H. GILMAN
1,616,486
DRILLING MACHINE
Filed Jan. 6, 1923   2 Sheets-Sheet 2
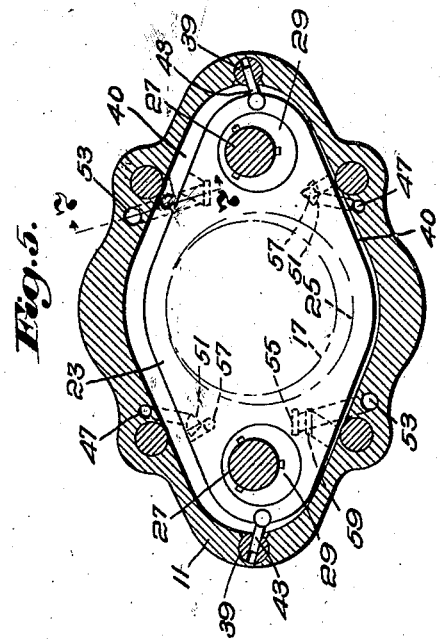
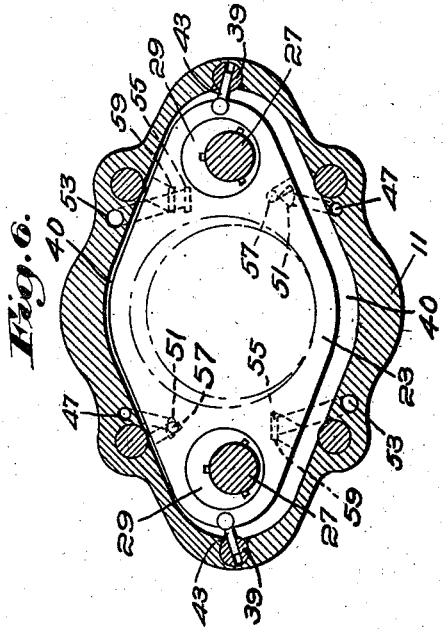
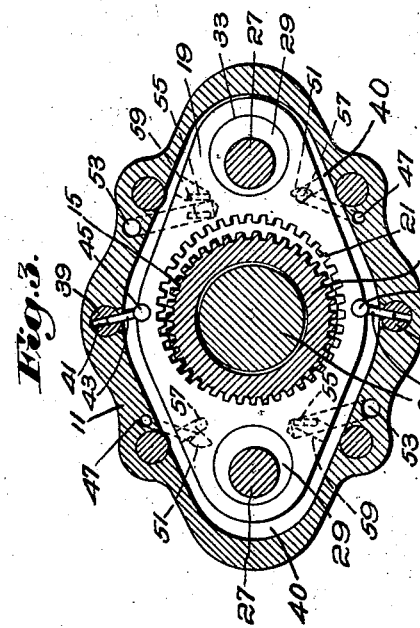
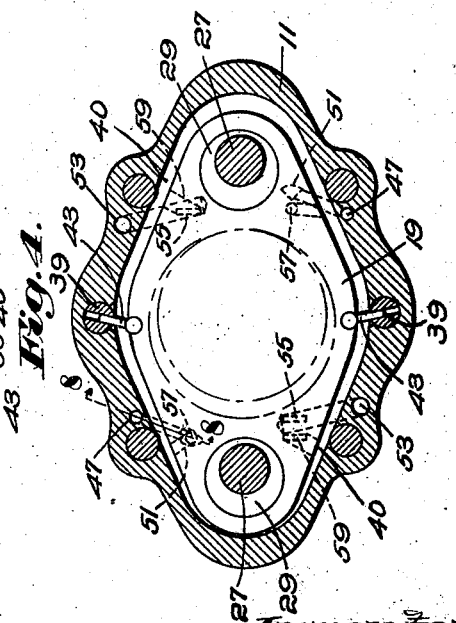
Inventor:
George H. Gilman.
by Emery Booth Janney & Varney
Attys Patented Feb. 8, 1927.

1,616,486

UNITED STATES PATENT OFFICE.

GEORGE H. GILMAN, OF BELMONT, MASSACHUSETTS.

DRILLING MACHINE.

Application filed January 6, 1923. Serial No. 611,171.

My invention relates to fluid pressure motors and drilling machines and particularly though not exclusively to hammer rock drills.

My invention will be best understood from the accompanying drawing and following description of one specific embodiment of my invention selected for illustrative purposes, while the scope of my invention will be more particularly pointed out in the appended claims.

In the drawing:—

Fig. 1 shows a longitudinal section of a hammer rock drill with parts omitted;

Figs. 2 and 3 respectively are sections on the lines 2—2 and 3—3 of Fig. 1;

Fig. 4 is a section corresponding to Fig. 3 with the parts moved to a different position;

Fig. 5 is a section on the line 5—5 of Fig. 1 with the eccentrics rotated ninety degrees out of position;

Fig. 6 is a section corresponding to Fig. 5 with parts moved to a different position;

Fig. 7 is a section on the line 7—7 of Fig. 5; and

Fig. 8 is a section on the line 8—8 of Fig. 4.

Referring to the drawings I have shown a working tool exemplified by a drill steel the shank portion 3 of which is received in the sectional chuck 5 in such manner that it is constrained to rotate with the chuck. Rearwardly of the chuck I provide a hammer 7 which as herein illustrated takes the form of a reciprocating piston provided with the hammer bar 9 adapted to strike the rearward end of the shank of the drill steel. Surrounding the chuck and hammer piston is a sectional casing indicated in its entirety at 11 in which the hammer piston is mounted for reciprocation and the chuck for rotation.

As illustrated the rearward section 13 of the chuck is provided with two annular series of external gear teeth 15 and 17. Surrounding the series of gear teeth 15 is a yoke member 19 provided with an annular series of internal gear teeth 21 which mesh with the gear teeth 15. Surrounding the series of gear teeth 17 is a yoke member 23 provided with a series of internal gear teeth 25 which mesh with the gear teeth 17.

At opposite sides of the chuck, as illustrated by Fig. 1, I provide rotatively mounted shafts 27, each of which carries the spaced eccentrics 29 and 31, the former being formed integrally with the shafts and the latter being removably keyed thereto for convenience in assembling the parts. The yokes 19 and 23 at opposite sides thereof are provided with bores 33 in which the eccentrics are received.

For causing the shafts 27 to rotate in unison each shaft herein has keyed thereto a gear 35 each of which meshes with an idle gear 37 which may be mounted for rotation in any convenient manner and herein is shown mounted upon the chuck. The parts are so constructed and arranged that the two eccentrics 29 and the two eccentrics 31 respectively rotate in phase whilst the eccentrics 29 are 180 degrees out of phase with the eccentrics 31.

It will be noted from the above construction that the members 19 and 23 are mounted for conjoint movement about the chuck on an orbit whose diameter is twice the eccentricity of the eccentrics. The action of the gear teeth 21 or 25 upon the gear teeth 15 or 17 respectively serves to transmit this rotary motion to the chuck, but at considerably reduced speed, which is to say a reduction gear is formed by the arrangement described. It will be also noticed that if force is applied to one of the members 19 and 23 to cause it to partake of its gyratory or orbital movement the shafts 27 will be rotated and consequently the other member will be given a similar motion. I make use of the above principles to form an exceedingly compact and effective motor and reduction gear for rotating the chuck.

Referring to Fig. 1 of the drawing it will be noticed that herein I provide the casing 11 with sections recessed to receive the gears and yokes and affording diaphragms 38 one of which separates the yoke 19 from the gears 35 and 37 and the other of which separates the two yokes. The yokes slidingly bear against the bottoms of the recesses receiving them and against the diaphragms in a fluid tight manner. The portions of these recesses surrounding the yokes provide the chambers 40 illustrated in Figs. 3 to 6. As shown each of the chambers 40 I divide into two chambers which are alternately expanded and contracted as the members 19 and 23 move around their orbit. To this end I herein mount in the casing the oscillatory cylindrical plugs 39 which are provided with the diametrical slots 41 which slidingly receive the members 43, the latter bearing against the same surfaces as the sides of the yoke and having cylindrical heads 45 mounted for oscillation in the members 19 and 23. These parts are so constructed as to fit their bearing surfaces in a fluid tight manner and serve as partitions preventing fluid from passing from one expansible chamber to the other. For a purpose hereinafter described these partitions are shown arranged at the ends of the longitudinal axis of the member 23 and at the ends of the transverse axis of the member 19.

Herein for admitting motive fluid to the expansible chambers above described I provide the casing with passages 47 leading from the source of motive fluid supply for the machine and with which communicate passages 49 formed in the diaphragms 38 and terminating in ports 51 opening upon one of the transverse faces of each of the members 19 and 23 as is clearly illustrated by Figs. 3 and 8. In a similar manner exhaust passages 53 leading to the atmosphere open through passages 54 terminating in ports 55 to the same transverse faces of the members 19 and 23. Leading from these faces of the members 19 and 23 through said members are passages 57 adapted to at times register with the ports 51 and passages 59 adapted to at times register with the ports 55.

The ports 51 and 57 and the ports 55 and 59 are so disposed that motive fluid will be alternately admitted and exhausted to and from opposite sides of the partitions 43. Referring to Fig. 3 it will be noticed that with the parts in the position illustrated by that figure motive fluid is admitted to the right hand expansible chamber, the ports 51 and 57 being in register, while the left hand expansible chamber will be in communication with the atmosphere, the ports 55 and 59 belonging to this chamber being in register. After the eccentrics have turned 180 degrees, as is shown by Fig. 4, motive fluid will be admitted to the left hand expansible chamber and the right hand expansible chamber will be connected to the atmosphere, for as will be noticed by Fig. 4, the ports 57 and 51 of the left hand chamber are in register and the ports 59 and 55 of the right hand chamber are in register.

Referring to Figs. 5 and 6 it will be noticed that with the parts in the position shown by Fig. 5 the motive fluid will be admitted to the lower side of the member 23 while the upper side will be connected to the atmosphere. When the eccentrics have turned 180 degrees to bring the parts into the position shown by Fig. 6 motive fluid will be admitted to the upper side of the member 23 and will be exhausted from beneath it.

It will be understood from the above described operation that the admission and exhaust for operating the member 19 occurs ninety degrees in advance of that of the member 23. In other words, considering the members 19 and 23 as motor pistons the same are set in "quartering" relation. This has a tendency to prevent "dead-centering". It will also be noticed that the members 19 and 23 are 180 degrees apart. This tends to neutralize vibration because said members move at all times in opposite directions to each other.

Although I have described an example of the invention having both the members 19 and 23 geared to the chuck it will be understood that only one of these members may be geared to the chuck, in which case motive fluid may operate upon only one of the members or upon both of them. Further it will be understood that if but one of the members 19 and 23 is geared to the chuck and motive fluid is admitted to act only upon the other member the latter will serve as a motor piston and the other merely as a reduction gear member. It will be likewise understood that if the forward member 23 only is geared to the chuck the rearward member 19 need not surround the chuck. The precise arrangement adopted will depend upon the conditions of operation, namely, principally upon the size of the parts and the speed desired. It will be further understood that although I have described for purposes of illustration one specific embodiment of my invention wide deviations may be made therefrom without departing from the spirit of my invention.

Claims.

1. In a drilling machine, a chuck carrying an external series of gear teeth, a member surrounding said chuck carrying an internal series of gear teeth in mesh with said external series, said member being mounted to permit said internal series of gear teeth to gyrate around said external series of gear teeth, a casing for said member forming therewith an expansible chamber intersected by planes including the pitch circles of said series of gear teeth, and means for admitting motive fluid to said casing and exhausting it therefrom for causing said member to operate.

2. In a drilling machine, a hammer piston for operating a drill steel, a rotary chuck formed for carrying said drill steel, said chuck carrying an external gear, an annular internal gear surrounding said chuck and meshing with said external gear, means supporting said internal gear for gyratory movement, and means permitting motive fluid to act upon the periphery of said external gear for gyrating it.

3. In a drilling machine, a hammer piston for operating a drill steel, a chuck formed for carrying said drill steel, said chuck carrying an external gear, an annular internal gear surrounding said chuck and meshing with said external gear, means at the side of said chuck supporting said internal gear for gyratory movement, and means forming with said internal gear an expansible chamber motor in which the motive fluid acts directly upon said internal gear in planes including the pitch circles of said gears.

4. In a rock drill, a chuck, a pair of eccentrics at opposite sides of said chuck, a member mounted on said eccentrics and surrounding said chuck, external gear teeth carried by said chuck meshing with internal gear teeth on said member, and means permitting motive fluid to act directly upon said member for gyrating it.

5. In a rock drill, a chuck, a pair of eccentrics at opposite sides of said chuck, a member mounted on said eccentrics and surrounding said chuck, external gear teeth carried by said chuck meshing with internal gear teeth on said member, means causing said eccentrics to rotate in unison, and means permitting motive fluid to act directly upon said member for gyrating it.

6. In a rock drill, a chuck formed for carrying a drill steel, a hammer piston coaxial with said chuck and drill steel, a fluid pressure motor for rotating said chuck, said motor having an annular piston member surrounding the axis of said piston and drill steel and mounted for gyratory movement around said axis, and speed reducing means connecting said motor to said chuck.

7. In a rock drill, a chuck formed for carrying a drill steel, a hammer piston coaxial with said chuck and drill steel, a fluid pressure motor for rotating said chuck, said motor having an annular piston member surrounding the axis of said piston and drill steel, means at the side of said axis for mounting said piston for gyratory movement around said axis, and speed reducing means connecting said motor to said chuck.

8. In a rock drill, a chuck formed for carrying a drill steel, a hammer piston coaxial with said chuck and drill steel, a fluid pressure motor for rotating said chuck, said motor having an annular piston member surrounding the axis of said piston and drill steel, means including an eccentric at the side of said axis for mounting said piston for gyratory movement around said axis, and speed reducing means connecting said motor to said chuck.

9. In a rock drill, a chuck formed for carrying a drill steel, a hammer piston, a fluid pressure motor for rotating said chuck, said motor having a member surrounding the axis of said piston and drill steel and mounted for orbital movement about said axis, said motor having shafts at opposite sides of said axis, an eccentric carried by each shaft, said eccentrics supporting said member of said motor, a gear carried by each shaft, a gear connecting said gears, means for permitting motive fluid to act directly upon said member for causing said member to operate, and speed reducing means for causing said motor to rotate said chuck.

10. In a rock drill, a chuck formed for carrying a drill steel, a pair of members surrounding said chuck each having internal gear teeth meshing with external gear teeth on said chuck, a mounting for said members permitting them to gyrate around said chuck in out of phase relation, and means for permitting motive fluid to act directly on said members for gyrating them.

11. In a rock drill, a chuck formed for carrying a drill steel, a pair of members surrounding said chuck each having internal gear teeth meshing with external gear teeth on said chuck, a mounting for said members permitting them to gyrate around said chuck in quartering relation, and means for permitting motive fluid to act directly on said members for gyrating them.

12. In a rock drill, a chuck formed for carrying a drill steel, a plurality of members surrounding said chuck and mounted for conjoint orbital movement, one of said members having gear teeth meshing with gear teeth on said chuck, and means for permitting motive fluid to act upon another of said members for causing said conjoint movement.

13. In a rock drill, a chuck formed for carrying a drill steel, a plurality of members surrounding said chuck, shafts at opposite sides of said chuck, eccentrics on said shafts on which said members are mounted, one of said members having gear teeth meshing with gear teeth on said chuck, and means for permitting motive fluid to act on another of said members for rotating said shafts.

14. In a rock drill, a chuck formed for carrying a drill steel, a hammer piston for operating said drill steel, a plurality of members surrounding the axis of said drill steel and piston and mounted for conjoint orbital movement about said axis, one of said members having gear teeth meshing with gear teeth on said chuck, and means for permitting motive fluid to act on another of said members for causing said conjoint movement.

15. In a rock drill, a chuck formed for carrying a drill steel, a hammer piston for operating said drill steel, a plurality of members surrounding the axis of said drill steel and piston, shafts at opposite sides of said axis, eccentrics on said shafts on which said members are mounted, one of said members having gear teeth meshing with gear teeth on said chuck, and means for permitting motive fluid to act on another of said members for rotating said shafts.

16. In a drilling machine, a chuck carrying an external series of gear teeth, a member surrounding said chuck carrying an internal series of gear teeth in mesh with said external series, said member being mounted to permit said internal series of gear teeth to gyrate around said external series of gear teeth, a casing for said member forming therewith an expansible chamber intersected by planes including the pitch circles of said series of gear teeth, and means directly controlled by said member for admitting motive fluid to said casing and exhausting it therefrom for causing said member to operate.

17. In a drilling machine, a hammer piston for operating a drill steel, a rotary chuck formed for carrying said drill steel, said chuck carrying an external gear, an annular internal gear surrounding said chuck and meshing with said external gear, means supporting said internal gear for gyratory movement, and means permitting motive fluid to act upon the periphery of said external gear for gyrating it, said motive fluid being directly controlled by said external gear.

18. In a drilling machine, a chuck, a member directly geared by gear teeth to said chuck, means for permitting motive fluid to act directly upon said member in planes including the pitch circles of the gear teeth for causing said member to operate to rotate said chuck, and said motive fluid being directly controlled by said member.

19. In a rock drill, a chuck, a pair of eccentrics at opposite sides of said chuck, a member mounted on said eccentrics and surrounding said chuck, external gear teeth carried by said chuck meshing with internal gear teeth on said member, means permitting motive fluid to act directly upon said member for gyrating it, and said motive fluid being directly controlled by said member.

20. In a rock drill, a chuck, a pair of eccentrics at opposite sides of said chuck, a member mounted on said eccentrics and surrounding said chuck, external gear teeth carried by said chuck meshing with internal gear teeth on said member, means causing said eccentrics to rotate in unison, means permitting motive fluid to act directly upon said member for gyrating it, and said motive fluid being directly controlled by said member.

21. In a rock drill, a chuck formed for carrying a drill steel, a hammer piston, a fluid pressure motor for rotating said chuck, said motor having a member surrounding the axis of said piston and drill steel and mounted for orbital movement about said axis, said motor having shafts at opposite sides of said axis, an eccentric carried by each shaft, said eccentrics supporting said member of said motor, a gear carried by each shaft, a gear connecting said gears, means for permitting motive fluid to act directly upon said member for causing said member to operate, said motive fluid being directly controlled by said member, and speed reducing means for causing said motor to rotate said chuck.

22. In a rock drill, a chuck formed for carrying a drill steel, a pair of members surrounding said chuck each having internal gear teeth meshing with external gear teeth on said chuck, a mounting for said members permitting them to gyrate around said chuck in out of phase relation, means for permitting motive fluid to act directly on said members for gyrating them, and such motive fluid being directly controlled by said members.

23. In a rock drill, a chuck formed for carrying a drill steel, a pair of members surrounding said chuck each having internal gear teeth meshing with external gear teeth on said chuck, a mounting for said members permitting them to gyrate around said chuck in out of phase relation, means for permitting motive fluid to act directly on said members for gyrating them, and said motive fluid for each member being directly and separately controlled thereby.

24. In a rock drill, a chuck formed for carrying a drill steel, a plurality of members surrounding said chuck and mounted for conjoint orbital movement, one of said members having gear teeth meshing with gear teeth on said chuck, means for permitting motive fluid to act upon another of said members for causing said conjoint movement, and said motive fluid being directly controlled by said member upon which it acts.

25. In a rock drill, a chuck formed for carrying a drill steel, a plurality of members surrounding said chuck, shafts at opposite sides of said chuck, eccentrics on said shafts on which said members are mounted, one of said members having gear teeth meshing with gear teeth on said chuck, means for permitting motive fluid to act on another 26. In a rock drill, a chuck formed for carrying a drill steel, a plurality of members surrounding said chuck and mounted for conjoint orbital movement, one of said members having gear teeth meshing with gear teeth on said chuck, means for permitting motive fluid to act upon another of said members for causing said conjoint movement, and said motive fluid being directly controlled by one of said members.

27. In a rock drill, a chuck formed for carrying a drill steel, a plurality of members surrounding said chuck, shafts at opposite sides of said chuck, eccentrics on said shafts on which said members are mounted, one of said members having gear teeth meshing with gear teeth on said chuck, means for permitting motive fluid to act on another of said members for rotating said shafts, and said motive fluid being directly controlled by one of said members.

28. In a rock drill, a chuck formed for carrying a drill steel, a hammer piston for operating said drill steel, a plurality of members surrounding the axis of said drill steel and piston and mounted for conjoint orbital movement about said axis, one of said members having gear teeth meshing with gear teeth on said chuck, means for permitting motive fluid to act on another of said members for causing said conjoint movement, and said motive fluid being directly controlled by the member upon which it acts.

29. In a rock drill, a chuck formed for carrying a drill steel, a hammer piston for operating said drill steel, a plurality of members surrounding the axis of said drill steel and piston and mounted for conjoint orbital movement about said axis, one of said members having gear teeth meshing with gear teeth on said chuck, means for permitting motive fluid to act on another of said members for causing said conjoint movement, and said motive fluid being directly controlled by one of said members.

30. In a rock drill, a chuck formed for carrying a drill steel, a hammer piston for operating said drill steel, a plurality of members surrounding the axis of said drill steel and piston, shafts at opposite sides of said axis, eccentrics on said shafts on which said members are mounted, one of said members having gear teeth meshing with gear teeth on said chuck, means for permitting motive fluid to act on another of said members for rotating said shafts, and said motive fluid being directly controlled by the member upon which it acts.

31. In a rock drill, a chuck formed for carrying a drill steel, a hammer piston for operating said drill steel, a plurality of members surrounding the axis of said drill steel and piston, shafts at opposite sides of said axis, eccentrics on said shafts on which said members are mounted, one of said members having gear teeth meshing with gear teeth on said chuck, means for permitting motive fluid to act on another of said members for rotating said shafts, and said motive fluid being directly controlled by one of said members.

32. In a hammer rock drill, a chuck formed for carrying a drill steel, a hammer piston for operating said steel, said chuck having external gear teeth, a member surrounding said chuck and having internal gear teeth meshing with said external gear teeth, a mounting for said member permitting it to gyrate about said chuck, and means permitting motive fluid to act upon said member in planes including said mounting and the pitch circles of said gear teeth for causing said member to gyrate.

33. In a hammer rock drill, a chuck formed for carrying a drill steel, a hammer piston for operating said steel, said chuck having external gear teeth, a member surrounding said chuck and having internal gear teeth meshing with said external gear teeth, a mounting for said member permitting it to gyrate about said chuck, and means permitting motive fluid to act upon said member in planes including said mounting and the pitch circles of said gear teeth for causing said member to gyrate, said motive fluid being directly controlled by said member.

34. In a fluid pressure motor, a pair of eccentrics mounted for rotation, a member mounted upon said eccentrics, a casing, means cooperating with said member and casing to provide an expansible chamber, and means for admitting and exhausting motive fluid to and from said chamber.

35. In a rock drill, a chuck formed for carrying a drill steel, a piston for operating said drill steel, a casing for said chuck and piston, said casing having therein a motor member mounted for gyratory movement, meshing gear teeth carried by said member and chuck for converting said gyratory movement into rotary movement for said chuck, and means for permitting motive fluid to act upon said motor member in planes including said mounting and the pitch circles of said gear teeth for causing said gyratory movement.

36. In a drilling machine, a chuck, gear teeth carried by said chuck, a motor member, an eccentric mounting permitting gyratory movement of said motor member, gear teeth carried by said member operatively connected to said gear teeth carried by said chuck, said eccentric mounting and gear teeth being in common planes transverse to the axis of the chuck, and means permitting motive fluid to act upon said motor member exteriorly thereof for causing its gyratory movement.

37. In a drilling machine, a chuck formed for carrying a drill steel, a hammer piston for operating said steel, a casing for said chuck and piston, a motor and reduction gearing for rotating said chuck, said motor and reduction gearing being carried by said casing and comprising a pair of parallel annular gyratory members substantially coaxial with said chuck and piston and connected in driving relation with said chuck, and means for causing motive fluid to act upon one of said gyratory members for gyrating it.

In testimony whereof, I have signed my name to this specification.

GEORGE H. GILMAN.